Oct. 1, 1957  R. E. CHERREAU  2,808,045
METHOD OF AND DEVICE FOR SAWING, MORE PARTICULARLY STONES
Filed May 9, 1956  3 Sheets-Sheet 1

Inventor
Raymond Edmond Cherreau
By

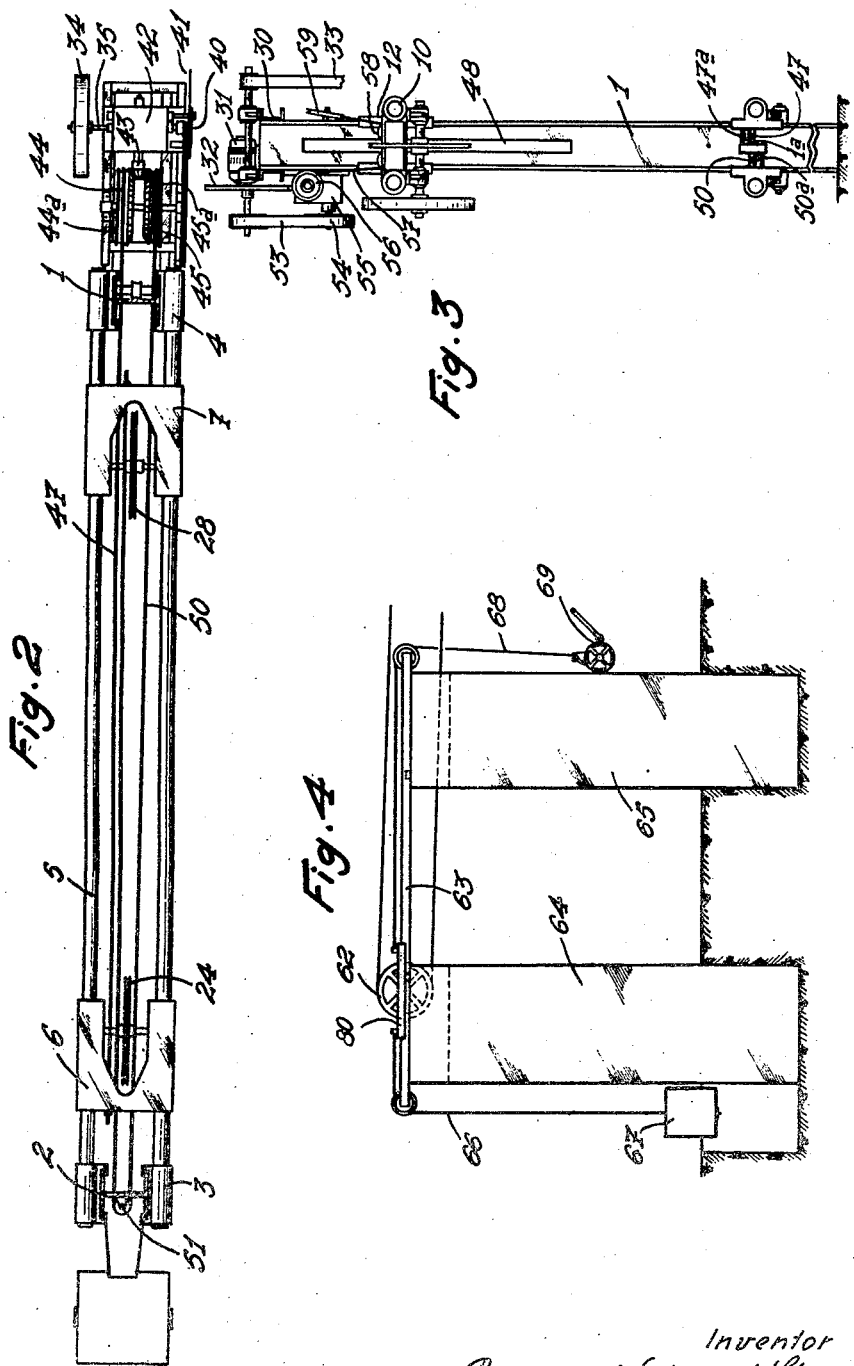

Inventor
Raymond Edmond Cherreau

United States Patent Office 2,808,045
Patented Oct. 1, 1957

2,808,045

METHOD OF AND DEVICE FOR SAWING, MORE PARTICULARLY, STONES

Raymond Edmond Cherreau, Beaune, France

Application May 9, 1956, Serial No. 583,792

Claims priority, application France May 10, 1955

15 Claims. (Cl. 125—21)

Stone blocks may be sawn by means of band blades or circular blades or by means of a helical wire. In helical wire sawing, when the pulleys which support the working portion of the wire are relatively far apart, the wire sags to a substantial extent, so that the bottom line of the saw-cut is curved, if the rate of feed motion is so chosen as to be consistent with a reasonable cost-price.

In known stone sawing machines, said working portion is arranged to be horizontal so that the distance between the end pulleys is rather great since the stone block to be cut must rest on a horizontal plane by its larger face.

One object of the present invention is to provide a method and a device designed to considerably reduce the sag of the working wire portion and, if wanted, to double the speed of a particular sawing operation.

For this purpose, according to the invention, a sawing machine is so arranged that the working portion of the wire runs in a substantially vertical direction. With such an arrangement, the distance between the pulleys may be reduced, thereby reducing the sag of the working portion, while facilitating the feeding and the removal of the cutting abrasives, as well as the removal of the residues.

According to a preferred embodiment, the sawing unit is arranged with two working portions of the wire operating together in the same cutting plane with a feed motion towards each other.

The present invention also includes mechanisms for carrying out the sawing method specified above, said mechanisms comprising means for adjusting the span between the pulleys which support each working portion of the wire, and means to move towards each other two pairs of such pulleys respectively supporting two oppositely working portions of wire.

In order that the invention may be better understood and readily carried into practice, some embodiments thereof will now be described more fully with reference to the accompanying drawings, in which:

Fig. 2 is a sectional plan view of the same machine according to the line II—II of Fig. 1.

Fig. 3 is an end view of the machine.

Fig. 4 is a diagrammatical view of a stretching device.

Figure 1:
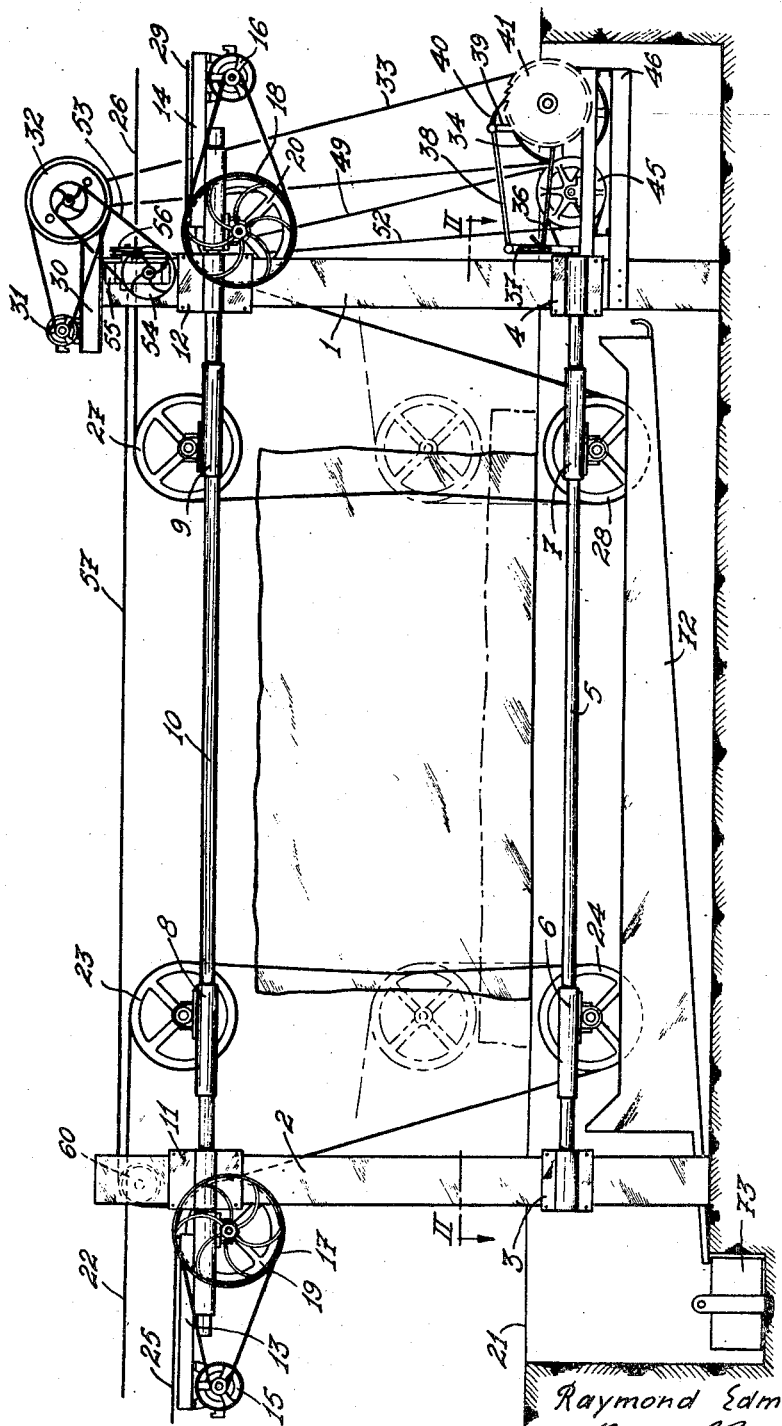
Fig. 1 is an elevational side view of a sawing machine embodying an arrangement of the invention.

Referring to Figs. 1 to 3, there is illustrated a sawing machine comprising two spaced uprights 1, 2 consisting of strong I-section metal members. Said uprights support at their lower part sliding brackets 3, 4 which may be adjustably fixed at the desired level. The brackets 3, 4 are connected together by a pair of tubular guide-bars 5 on which are movably mounted two lower-pulley-carrying slides 6 and 7.

Two higher-pulley-carrying slides 8, 9 are movably mounted on a pair of tubular guide-bars 10 maintained in opposite sliding brackets 11, 12 adjustably mounted on the uprights 1, 2. Adjacent the sliding brackets 11, 12 are mounted on the guide-bars 10 plates 13, 14 for respectively supporting driving motors 15, 16 connected through belts with two flywheels 17, 18 the shafts of which carry pulleys 19, 20, respectively, on which pass the corresponding sawing wires.

The lower end of the uprights 1, 2 is housed, for example, in a pit, the ground level 21 being slightly above the top of the lower pulleys 24, 28 carried by the slides 6, 7.

The left sawing wire 22 passes over the left upper pulley 23 carried by the slide 8, then vertically downward and over the left lower pulley 24 carried by the slide 6 and thence upward to pass over the driving pulley 19. Beyond said pulley 19, the wire extends at 25 parallel to its direction toward the pulley 23, the two parallel wire portions being joined over a stretching pulley as will be described hereafter.

Similarly, at the right end of the machine, there is arranged a sawing wire 26 passing over a pulley 27 corresponding to the left pulley 23, a pulley 28 corresponding to the pulley 24, and the driving pulley 20. The wire portion 29 leaving the driving pulley 20 is parallel to the incoming portion of the wire 26 and again is joined thereto over a stretching pulley.

At its top, the upright 1 carries a platform 30 supporting a motor 31 driving a flywheel 32 through a speed-reducing belt-connection. The shaft of said flywheel drives in turn through a belt 33 the pulley 34 fixedly mounted on a shaft 35 carrying a crankpin. Said crankpin actuates a connecting rod 36 adjustably pivoted to an oscillating link 37. Said link is pivoted to a connecting rod 38 for oscillating an arm 39 carrying a pawl 40. The pawl 40 cooperates with a ratchet wheel 41 mounted on a shaft which actuates an angle drive housed in a casing 42. The output shaft of said angle drive carries at its outer end a bevel pinion 43 meshing with two opposite bevel wheels 44, 45, said bevel wheels being respectively fast with winch-drums 44a and 45a. The whole assembly thus actuated by the pulley 34 is carried by a bracket 46 secured on the upright 1.

The winch-drum 44a associated with the bevel wheel 44 is used to wind a pair of cables 47 and 49 to pull the left slides 6, 8. One of said cables 47 passes under a roller 47a adjacent a hole 1a in the web of the upright 1, and extends through said hole straight to the slide 6 at the back of which it is anchored by means of an adjustable stretching device. The second cable 49 passes over a pulley not shown inside the sliding bracket 12, and through the slot 48 in the web of the upright 1, and is anchored like the first cable 47 behind the slide 8. The winch-drum 45a fast with the bevel wheel 45 is used to wind in the same manner a pair of cables 50 and 52. The cable 50 passes under a roller 50a, through the slot 1a in the web of the upright 1 and back over an end guide pulley 51 behind the web of the upright 51 to the slide 7 at the back of which it is adjustably anchored. The second cable 52 passes over a pulley not shown inside the sliding bracket 12, over a pulley similar to the pulley 51 mounted on the sliding bracket 11 and back to the slide 9 to be anchored thereto. Thus, each step of the ratchet wheel 41 causes the slides 6, 7, 8, 9 to draw nearer simultaneously along the guidebars 5, 10 under the action of cables 47, 49, 50 and 52.

The shaft of the flywheel 32 drives, through a belt 53, the pulley 54 of an angle drive 55 provided with a clutch and a brake and carried by one of the flanges of the upright 1. The output shaft 54 of said angle drive carries a winch-drum 56 whereon is wound a cable 57. Said cable passes on a pair of pulleys 58 having horizontal parallel shafts mounted on the sliding bracket 12. Therefrom the cable 57 passes over an inclined pulley 59 the shaft of which is secured to the upright 1 adjacent the top thereof and thence over a pulley 60 corresponding to the pulley 59 on a shaft secured to the top of the upright 2. Beyond said pulley 60, the cable 57 is attached to the sliding bracket 11. When the brake is applied to the drum 56, the sliding brackets 11, 12 remain at the same fixed level at which they were set on the uprights 1, 2. By releasing the brake, said brackets may be lowered together. By engaging the clutch to connect the drum 56 with the motor 31, the sliding brackets may be caused to rise in unison along the uprights 1, 2. Thus may be adjusted the span of the opposite, co-planar working portions of the sawing wire between the pulleys 23, 24 and 27, 28 respectively.

The sawing wire stretching means may consist simply of a pair of opposite stretching carriages 80 and 80a carrying each an end guide-pulley 62 or 62a, said carriage moving on bars 63 supported by pillars 64, 65.

Figure 5:
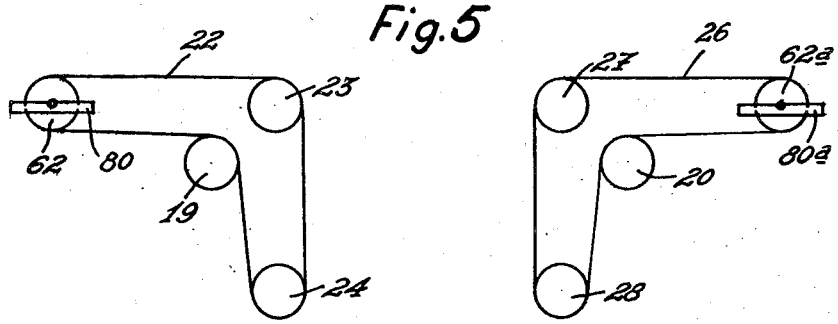
Fig. 5 is a reeving diagram of the wires in an embodiment comprising two separate stretching devices.

Such a carriage may be connected by a cable 66 to a stretching counterweight 67 and by a cable 68 to a return winch 69. In the arrangement shown in the reeving diagram of Fig. 5, two symmetrically opposed stretching devices are used for two sawing cables.

Figure 6:
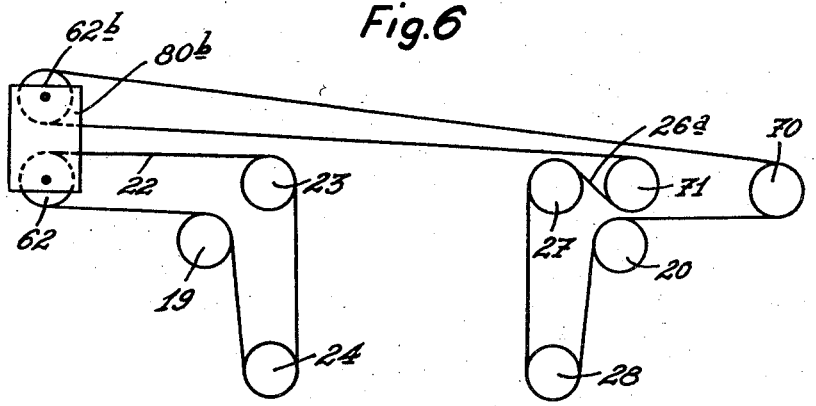
Fig. 6 is a reeving diagram in an alternative embodiment comprising a single stretching device.

With the arrangement shown in Fig. 6, only one stretching carriage 80b may be used for two sawing wires if the wire 26a of one side is led over the end pulley 70 to a pulley 62b carried by the same carriage 80b as the pulley 62 at the other side, and back from the pulley 62b to an additional guide-pulley 71 disposed before the pulley 27.

Figure 7:
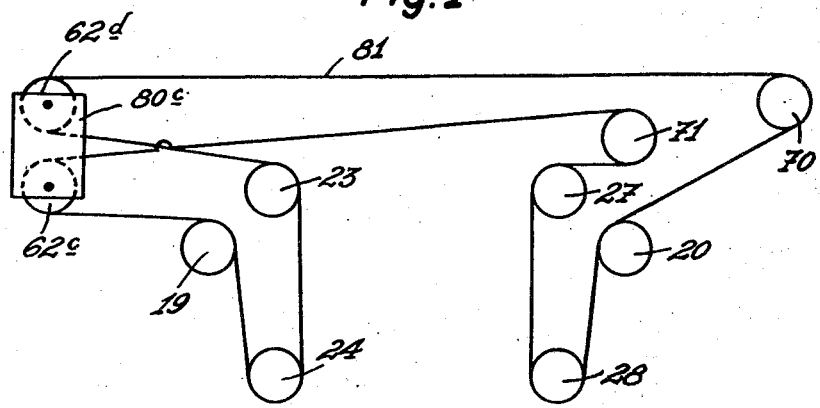
Fig. 7 is a reeving diagram in another embodiment comprising a single sawing wire and a single stretching device.

As shown in Fig. 7, with the same number of pulleys as in the arrangement of Fig. 6, is is possible to use a single sawing wire 81 by reeving it according to a suitable path. The wire 81 passes successively on the pulleys 23, 24, 19, 62c, 71, 27, 28, 20 and back over the pulley 70 to the stretching pulley 62d wherefrom it returns to the pulley 23. In that case, the wire may be driven by a single motor.

Under the two pulleys 24, 28, in the aforementioned pit, is disposed an inclined gutter 72 to receive the sawing abrasive material. The gutter discharges into a collecting case 73 wherefrom the abrasive may be recovered by hand to be delivered back to the top of the saw-cuts, or to the feed trough of an automatic elevator, not shown, of any suitable type also arranged to deliver the abrasive back to the top of the saw-cuts.

The operation of the illustrated apparatus will be readily understood from the above description and therefore does not need a particular more detailed explanation.

The vertical sawing thus provided may be effected with a feed motion of the pulleys supporting the working portions of wire or alternatively with a feed motion of the stone-block carrier if such a carrier is provided. The sawing method of the invention offers many advantages. Its main advantage results from the possibility of positioning the pulleys supporting the wire working portions close to the larger faces of the stone-block to be sawn, as shown in chain lines in Fig. 1, thus reducing the sag of said working portions in all cases. As a consequence, the saw-cuts are substantially straight, which permits to saw along curved or cranted lines, and to cut out tongue and grooves for example. The machine may operate either with one saw-cut only, or with two saw-cuts, in which latter case of course the efficiency is doubled. In any case, owing to the small sag, high feed rates may be used. The number of pulleys is reduced to a minimum. The individual drive by two motors provides a great flexibility of operation. The feed is automatic and may be adjusted in a wide range for using various abrasives. The return motion of the sawing wire pulleys is rapid and effected simply by the stretching devices.

The stone-blocks may be sawn at ground level, without necessitating special supporting wood structures, which saves considerable working time. Moreover, the blocks have an efficient rest on their larger face, reducing the risks of breakage without any particular equipment being necessary therefor.

Of course, many modifications may be made in the embodiments described, without departing from the scope and spirit of the invention as defined in the following claims.

What I claim is:

1. A method of sawing blocks, more particularly stone blocks, by means of flexible cord-like means, such as wires, which consists in vertically disposing the working portion of the flexible cord-like sawing means, and moving said working portion in a substantially horizontal direction.

2. A method of sawing blocks, more particularly stone blocks, by means of flexible cord-like means, such as wires, which consists in vertically disposing the working portion of the flexible cord-like sawing means, adjusting the vertical length of said working portion as close as possible to the height of the block to be sawn, and moving said working portion in a substantially horizontal direction.

3. A method of sawing blocks, more particularly stone blocks, by means of flexible cord-like means, such as wires, which consists in vertically disposing in a common vertical plane the working portions of two flexible cord-like sawing means, and simultaneously moving said working portions in opposite horizontal directions in said plane.

4. A method of sawing blocks, more particularly stone blocks, by means of flexible cord-like means, such as wires, which consists in vertically disposing in a common vertical plane the working portions of two flexible cord-like sawing means, simultaneously adjusting the lengths of said working portions as close as possible to the height of the block to be sawn, and simultaneously moving said working portions in opposite horizontal directions in said plane.

5. A method of sawing blocks, more particularly stone blocks, by means of flexible cord-like means such as wires, which consists in forming a single flexible cord-like sawing means with two vertical working portions disposed in a common vertical plane, simultaneously adjusting the lengths of said working portions as close as possible to the height of the block to be sawn, and simultaneously moving said working portions in opposite horizontal directions in said plane.

6. A device for sawing blocks, more particularly stone blocks, by means of two flexible cord-like means, such as two helical wires, comprising, in combination, a pair of upper and a pair of lower means located in a common vertical plane for guiding at their ends the working portions of the two flexible cord-like sawing means, means for vertically placing in alignment the guiding means of said pairs corresponding to said working portions, respectively, whereby said working portions are vertical, means for simultaneously lifting and lowering the guiding means of the upper pair with a view to position said guiding means as close as possible to the block to be sawn, means for moving together the two groups of vertically aligned guiding means in opposite horizontal directions, means for stretching the flexible cord-like sawing means, and means for driving said flexible cord-like sawing means passing on said guiding and stretching means.

7. A device for sawing blocks, more particularly stone blocks, by means of two flexible cord-like means, such as two helical wires, comprising, in combination, two uprights between which the block to be sawn is placed, upper and lower pairs of sliding members slidably mounted respectively on said uprights, the sliding members of the lower pair being previously adjusted on said uprights with respect to the laying plane of the blocks to be sawn, upper and lower pairs of horizontal guide-bars respectively connecting said upper and lower pairs of sliding members, upper and lower pairs of carriages slidably mounted respectively on said upper and lower pairs of guide-bars, upper and lower pairs of similar pulleys rotatably mounted respectively on the carriages of said upper and lower pairs, each upper pulley being adapted to guide with a lower pulley the working portion of one of the flexible cord-like sawing means, means for vertically aligning together the pulleys of the upper and lower pairs, means for simultaneously lifting and lowering the sliding members of the upper pair with a view to position the corresponding pulleys as close as possible to the block to be sawn, means for moving together the two groups of vertically aligned pulleys in opposite horizontal directions, means for stretching the flexible cord-like sawing means, and means for driving said flexible cord-like sawing means passing on said pulleys and stretching means.

8. A device according to claim 7, wherein the sliding members of the lower pair are so positioned on the uprights that the tops of the pulleys of the lower pair are just beneath the ground whereon rests the block to be sawn.

9. A device according to claim 7, wherein the means for vertically aligning together the pulleys, for simultaneously lifting and lowering the upper sliding members and for moving together the two groups of vertically aligned pulleys in opposite horizontal directions comprise a motor supported by an upright, a lifting and lowering drum carried by said upright and driven by said motor, a clutch and a brake interposed between said motor and said drum, a cable wound on said drum, pulleys carried by the uprights for guiding said cable, pulleys carried by the sliding members of the upper pair and on which passes said cable with a view to operatively connecting said sliding members with said drum, an intermediate drive driven by said motor and a horizontal mechanism for a simultaneous feed motion of the carriages of the upper and lower pairs.

10. A device according to claim 9, wherein the horizontal mechanism for a feed motion of the carriages comprises a pawl displaceable in a vertical plane and having an adjustable stroke, means for adjusting said stroke under the action of the motor, a vertical ratchet wheel adapted to be driven by said pawl, a bevel pinion connected to said ratchet wheel, two opposite winch-drums driven by said bevel pinion, two cables adapted to be pulled by each of said winch-drum and respectively attached to the upper and lower carriages on one side of the machine, and horizontal upper and lower end pulleys carried by the upright which is the more distant from said drums, a pair of said cables pulling the upper and lower carriages adjacent to said drums over said end pulleys whereas the other pair of cables directly pull the other upper and lower carriages.

11. A device according to claim 7, wherein the means for stretching the flexible cord-like sawing means comprises, for each flexible cord-like sawing means, a carriage, an end pulley on said carriage over which passes said flexible cord-like sawing means, and means for applying a tractive force on said carriage in a direction opposite to that of said flexible cord-like means.

12. A device according to claim 7, wherein the means for stretching the flexible cord-like sawing means comprises a carriage, two end pulleys on said carriage over which respectively pass the two flexible cord-like sawing means, and means for applying a tractive force on said carriage in a direction opposite to that of said flexible cord-like means.

13. A device, according to claim 7, further comprising an inclined gutter placed under the lower pulleys at the outlet from the saw-cuts to recover the abrasives.

14. A device for sawing blocks, more particularly stone blocks, by means of a single flexible cord-like means, such as a helical wire, comprising, in combination, a pair of upper and a pair of lower means located in a common vertical plane for guiding at their ends two working portions formed on the single flexible cord-like sawing means, means for vertically placing in alignment the guiding means of said pairs corresponding to said working portions, respectively, whereby said working portions are vertical, means for simultaneously lifting and lowering the guiding means of the upper pair with a view to position said guiding means as close as possible to the block to be sawn, means for moving together the two groups of vertically aligned guiding means in opposite horizontal directions, means for stretching the single flexible cord-like sawing means, and means for driving said single flexible cord-like sawing means passing on said guiding and stretching means.

15. A device according to claim 14, wherein the means for stretching the single flexible cord-like sawing means comprises a carriage, two end pulleys on said carriage over which respectively pass the two portions of said single flexible cord-like sawing means which are comprised between the two working portions thereof, and means for applying a tractive force on said carriage in a direction opposite to that of said flexible cord-like means.

References Cited in the file of this patent

UNITED STATES PATENTS

| | | |
|---|---|---|
| 958,684 | Witt | May 17, 1910 |
| 1,619,128 | Jobst | Mar. 1, 1927 |
| 1,764,088 | Sawyer | June 17, 1930 |
| 2,368,092 | Anderson | Jan. 30, 1945 |

FOREIGN PATENTS

| | | |
|---|---|---|
| 7,519 | Great Britain | Apr. 19, 1887 |
| 10,115 | France | Feb. 9, 1909 |
| | (Addition to No. 395,568) | |
| 24,351 | Germany | Jan. 14, 1883 |
| 54,089 | Sweden | Dec. 5, 1911 |
| 198,154 | Great Britain | May 31, 1923 |